US012387633B2

(12) United States Patent
Schuetz et al.

(10) Patent No.: US 12,387,633 B2
(45) Date of Patent: Aug. 12, 2025

(54) ELECTRIC SIGN DEVICE

(71) Applicants: Major Roy Schuetz, McKinney, TX (US); Kelly Jo Schuetz, McKinney, TX (US)

(72) Inventors: Major Roy Schuetz, McKinney, TX (US); Kelly Jo Schuetz, McKinney, TX (US)

( * ) Notice: Subject to any disclaimer, the term of this patent is extended or adjusted under 35 U.S.C. 154(b) by 177 days.

(21) Appl. No.: 18/389,322

(22) Filed: Nov. 14, 2023

(65) Prior Publication Data

US 2025/0157368 A1 May 15, 2025

(51) Int. Cl.
*G09F 13/04* (2006.01)

(52) U.S. Cl.
CPC ...... *G09F 13/0404* (2013.01); *G09F 13/0418* (2021.05)

(58) Field of Classification Search
CPC .......................... G09F 13/0404; G09F 13/0418
See application file for complete search history.

(56) References Cited

U.S. PATENT DOCUMENTS

| | | | | | |
|---|---|---|---|---|---|
| 873,921 | A * | 12/1907 | Chester | G09F 13/0404 | 40/552 |
| 3,221,432 | A * | 12/1965 | Gold | G09F 13/0404 | D18/26 |
| 3,404,475 | A * | 10/1968 | Coad | G09F 13/0404 | 40/552 |
| 3,447,253 | A * | 6/1969 | Coad | G09F 13/0404 | 40/552 |
| 3,553,870 | A * | 1/1971 | Rudolph | G09F 7/06 | 40/576 |
| 4,028,828 | A * | 6/1977 | Chao | G09F 13/28 | 40/620 |
| 4,951,405 | A * | 8/1990 | Sabala | G09F 9/305 | 40/551 |
| 6,305,110 | B1 * | 10/2001 | Chang | G09F 13/26 | 40/552 |
| 8,419,253 | B2 * | 4/2013 | Burrak | G09F 13/0404 | 362/555 |
| 9,548,008 | B1 * | 1/2017 | Manning | G09F 9/302 | |
| 2004/0255497 | A1 * | 12/2004 | Venkataraman | G09F 13/04 | 40/551 |
| 2014/0237871 | A1 * | 8/2014 | Callahan | G09F 13/0404 | 40/541 |
| 2021/0183279 | A1 * | 6/2021 | Walczak, Jr. | G09F 13/0404 | |

* cited by examiner

*Primary Examiner* — Gary C Hoge
(74) *Attorney, Agent, or Firm* — The Rapacke Law Group, P.A.; Andrew Rapacke

(57) ABSTRACT

An electric sign device can include a backboard; first and second metal strips attached to the backboard; a plurality of LED assemblies, each LED assembly comprising: a board; first and second metal contacts attached to a first side of the board; first and second magnets attached to the first and second metal contacts, respectively; the first and second metal contacts contacting the first and second metal strips, respectively; a plurality of LEDs disposed on a second side of the board, the plurality of LEDs being electrically connected to the first and second metal contacts; and a carrier having one or more channels or apertures that receive the plurality of LEDs, the carrier being attached to the board; wherein the first and second magnets are magnetically attached to the first and second metal strips, respectively, so that the each LED assembly is magnetically attached to the backboard.

20 Claims, 5 Drawing Sheets

ELECTRIC SIGN DEVICE

TECHNICAL FIELD

The embodiments generally relate to the field of electric sign devices.

BACKGROUND

Electric signs can typically include light emitting diode (LED) strips adhered to metal text characters. However, such signs are not customizable as the positions of the metal text characters are generally completely fixed.

There is a need for an electric sign that includes text characters that are rearrangeable.

SUMMARY

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

In general, the disclosed electric sign device can include a backboard; first and second metal strips attached to the backboard; a plurality of LED assemblies, each LED assembly comprising: a board; first and second metal contacts attached to a first side of the board; first and second magnets attached to the first and second metal contacts, respectively; the first and second metal contacts contacting the first and second metal strips, respectively; a plurality of LEDs disposed on a second side of the board, the plurality of LEDs being electrically connected to the first and second metal contacts; and a carrier having one or more channels or apertures that receive the plurality of LEDs, the carrier being attached to the board; wherein the first and second magnets are magnetically attached to the first and second metal strips, respectively, so that the LED assembly is magnetically attached to the backboard.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
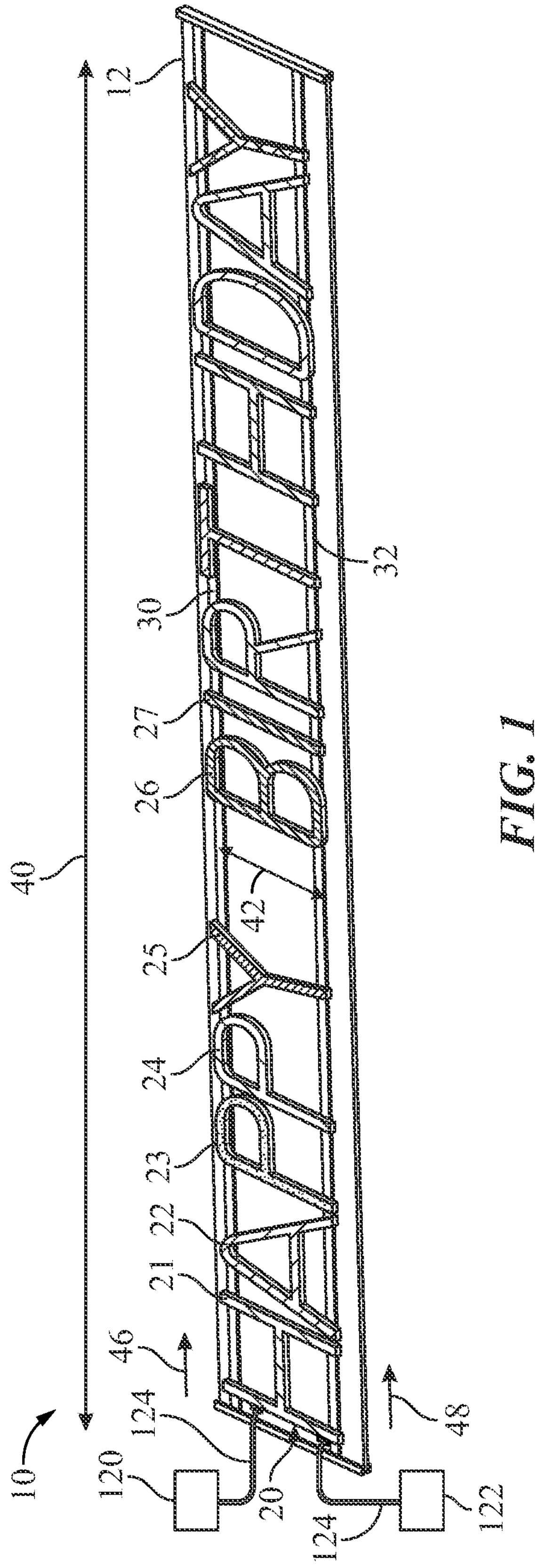
FIG. 1 illustrates an illustrative depiction of an electric sign, in accordance with some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are to the described product or methods of use. Any specific details of the embodiments are used for demonstration purposes only and no unnecessary limitations or inferences are to be understood from there.

It is noted that the embodiments reside primarily in combinations of components and procedures related to the products. Accordingly, the product and components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to an electric sign device that can include a backboard. The electric sign device can include first and second metal strips attached to the backboard and a plurality of LED assemblies, wherein each LED assembly comprises: a board; first and second metal contacts attached to a first side of the board; first and second magnets attached to the first and second metal contacts, respectively; the first and second metal contacts contacting the first and second metal strips, respectively; a plurality of LEDs disposed on a second side of the board, the plurality of LEDs being electrically connected to the first and second metal contacts; and a carrier having one or more channels or apertures that receive the plurality of LEDs, the carrier being attached to the board; wherein the first and second magnets are magnetically attached to the first and second metal strips, respectively, so that the each LED assembly is magnetically attached to the backboard.

In some embodiments, the backboard and carrier can be made primarily of acrylic. In some embodiments, the board of each LED assembly can be a printed circuit board (PCB) such as, for example, a FR-4 fiberglass PCB having a thickness of approximately 0.03 inches. The first and second metal strips can be made primarily of galvanized steel. In some embodiments, the first and second magnets can comprise neodymium and can be approximately 7 mm in diameter and 2 mm in thickness. Any electronics can be attached to a board of an LED assembly by soldering, using for example, a pick-and-place machine and a surface mount technology reflow oven. In some embodiments, the carrier and board can be cut or shaped by using computer numerical control (CNC) machining and/or laser cutting.

Referring to FIG. 1, an electric sign device 10 can include a first board 12 (e.g., a backboard). A first metal strip 30 can be attached to the first board 12, the first metal strip 30 having at least a first length 40 and extending along the first board 12. A second metal strip 32 can be attached to the first board 12, the second metal strip 32 having at least the first length 40 and extending along the first board 12, the second metal strip 32 being separated from the first metal strip 30 by a first predetermined distance 42. In some embodiments, the first metal strip 30 extends in a first direction 46, and the second metal strip 32 extends in a second direction 48 that is parallel to the first direction 46.

The electric sign device 10 can include one or more light emitting diode (LED) assemblies 20. The one or more LED assemblies 20 can include LED assemblies 21, 22, 23, 24, 25, 26, and 27. In some embodiments, the LED assemblies 21, 22, 23, etc. can be formed to represent respective text characters "H", "A", "P", "P", "Y", B, "I", "R", "T", "H", "D", "A", "Y", representing a phrase or message "HAPPY BIRTHDAY." However, in other embodiments, any suitable text characters can be represented by the LED assemblies 21, 22, 23, etc. For example, any English letters, symbols (e.g., mathematical symbols), punctuation marks/symbols, non-English characters, emojis, etc. can be represented by the LED assemblies 21, 22, 23, etc. In some embodiments, the text characters represented by the LED assemblies 21, 22, 23, etc. can be selected to represent any suitable phrase or message.

In some embodiments, any suitable number of LED assemblies can be included in the one or more LED assemblies 20. In some embodiments, the first metal strip 30 or the second metal strip 32 can be constructed and arranged to be connected to a power source 120 by an electrical connection 124 to provide power to the LEDs in the LED assemblies 20. In some embodiments, the first metal strip 30 or the second metal strip 32 can be constructed and arranged to be connected to a reference potential 122 (e.g., ground) by an electrical connection 124.

Figure 2:
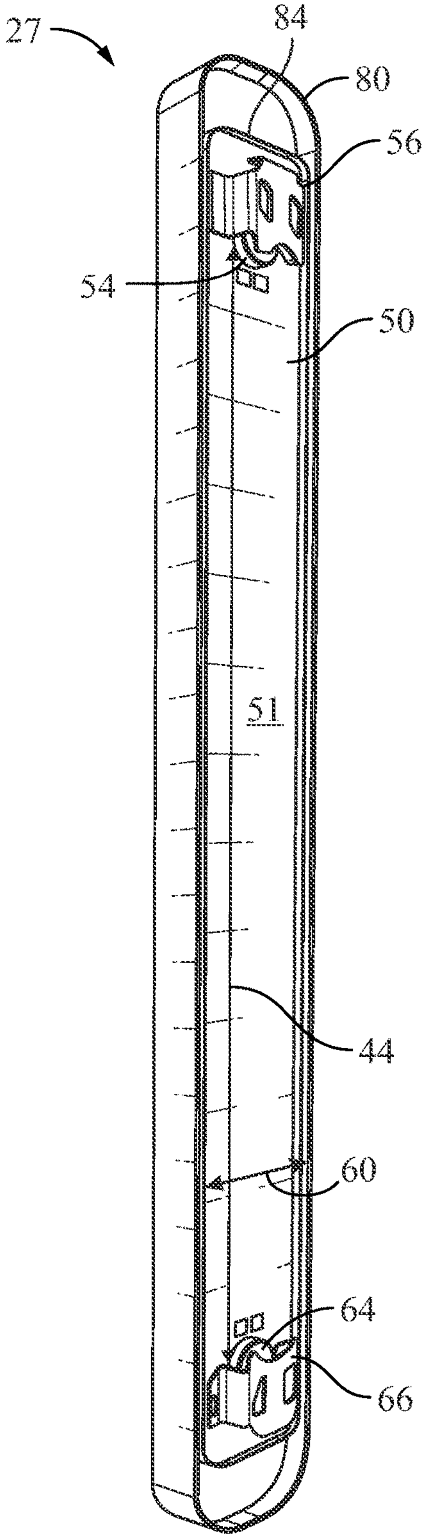
FIG. 2 illustrates an illustrative depiction of an LED assembly, in accordance with some embodiments.

Referring to FIG. 2, an LED assembly 27 can include a second board 50 having a first width 60 that is smaller than the first length (e.g., 40 in FIG. 1). In some embodiments, the LED assembly 27 can include a first magnet 54. The LED assembly 27 can include a first metal contact 56 attached to a first side 51 of the second board 50. In some embodiments, the first metal contact 56 can be constructed and arranged to receive the first magnet 54. In some embodiments, the first magnet 54 can be attached (e.g., magnetically attached) to the first metal contact 56. In some embodiments, the first magnet 54 can be attached to the first side 51 of the second board 50, wherein the first magnet 54 is proximate to the first metal contact 56.

In some embodiments, the LED assembly 27 can include a second magnet 64. A second metal contact 66 can be attached to the first side 51 of the second board 50, the second metal contact 66 being separated from the first metal contact 56 by a second predetermined distance 44. The second metal contact 66 can be constructed and arranged to receive the second magnet 64. In some embodiments, the second magnet 64 can be separated from the first magnet 54. In some embodiments, the second magnet 64 can be attached (e.g., magnetically attached) to the second metal contact 66. In some embodiments, the second magnet 64 can be attached to the first side 51 of the second board 50, wherein the second magnet 64 is proximate to the second metal contact 66.

While two metal contacts 56, 66 are illustrated, any suitable number of metal contacts can be included in the LED assembly 27. While two magnets 54, 64 are illustrated, any suitable number of magnets can be included in the LED assembly 27.

Figure 3:
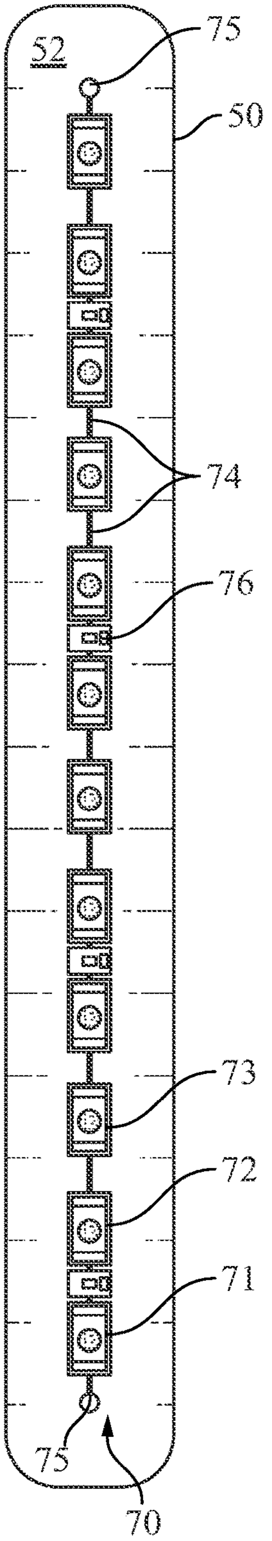
FIG. 3 illustrates an illustrative depiction of an LED assembly with a carrier omitted, in accordance with some embodiments.

Referring to FIG. 3, a first plurality of LEDs 70 can be disposed on a second side 52 of the second board 50, the first plurality of LEDs 70 being electrically connected to the first metal contact (e.g., 56 in FIG. 2) and the second metal contact (e.g., 66 in FIG. 2). The first plurality of LEDs 70 can be soldered on the second board 50. Electrical connections 74 can be formed between the LEDs 70. In some embodiments, one or more resistors 76 can be electrically connected between one or more LEDs of the plurality of LEDs 70. Electrical vias 75 can electrically connect the plurality of LEDs 70 on the second side 52 of the second board 50 to the first metal contact and the second metal contact attached to the first side 51 of the second board 50.

In some embodiments, the plurality of LEDs 70 can include at least a first LED 71, a second LED 72, and a third LED 73. In some embodiments, the LEDs 71, 72, 73 of the plurality of LEDs 70 are electrically connected in series. Any suitable number of LEDs can be included in the plurality of LEDs 70.

Figure 4:
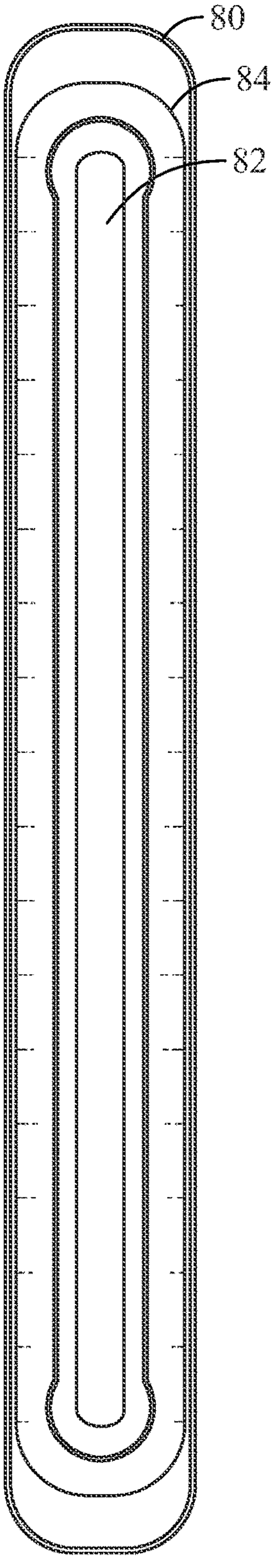
FIG. 4 illustrates an illustrative depiction of a carrier of an LED assembly, in accordance with some embodiments.

Referring to FIG. 4, a first carrier 80 can have one or more first channels or apertures 82 that are constructed and arranged to at least partially receive the first plurality of LEDs (e.g., 70 in FIG. 3). After receiving the first plurality of LEDs, a fluid seal can be formed between the first carrier 80 and the second board 50 to at least partially fluidly seal the one or more channels or apertures and the LEDs. In some embodiments, the fluid seal can be formed by using epoxy (e.g., epoxy resin). Referring to FIGS. 2 and 4, the first carrier 80 can have one or more channels 84 that are constructed and arranged to receive the second board 50. The second board 50 can be attached to the first carrier 80 and can be positioned at least partially inside the one or more channels 84. In some embodiments, another fluid seal can be formed using epoxy (e.g., epoxy resin) on the first side 51 of the second board 50 and the first carrier 80 to fluidly seal the second board 50 to the first carrier 80. In some embodiments, the first carrier 80 can be at least partially transparent.

Figure 5:
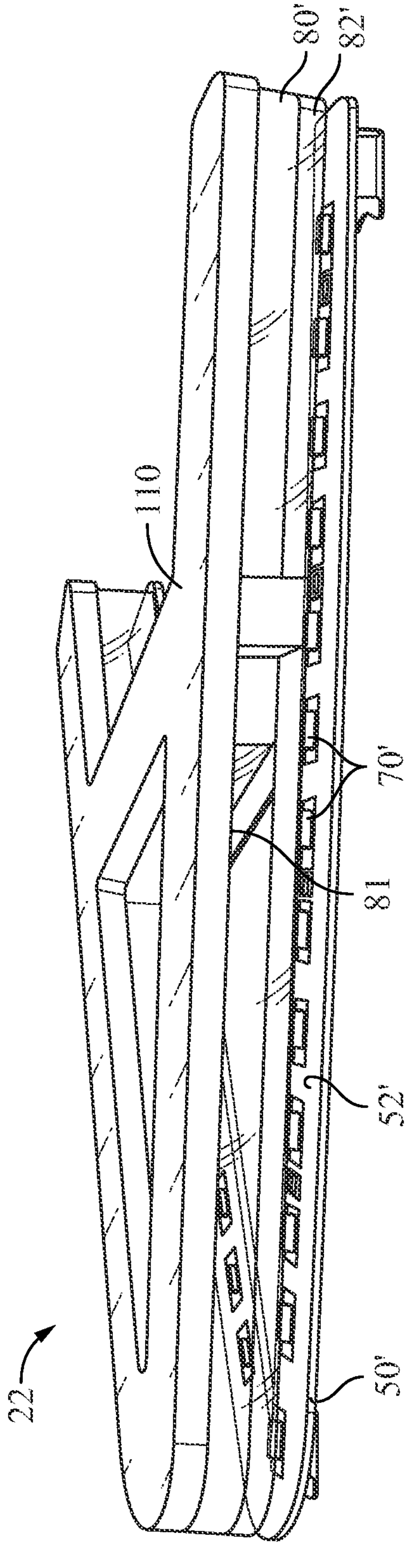
FIG. 5 illustrates an illustrative depiction of an LED assembly that includes a carrier cover, in accordance with some embodiments.

Referring to FIG. 5, in some embodiments, an LED assembly 26 can include a carrier cover 110 attached to a carrier 80'. The carrier cover 110 can be constructed and arranged to cover at least a portion 81 of the carrier 80'. In some embodiments, the carrier cover 110 can be at least partially transparent. In some embodiments, the carrier cover 110 can be less transparent than the carrier 80' to, for example, diffuse more light from the LEDs 70' than the carrier 80'. The carrier cover 110 can be positioned over the plurality of LEDs 70'. The plurality of LEDs 70' can be disposed on a second side 52' of a second board 50'. The LEDs 70' can be positioned at least partially inside the one or more channels or apertures 82'. The plurality of LEDs 70' can be positioned at least partially between the second side 52' and the carrier cover 110. In some embodiments, the one or more channels or apertures 82' do not extend through (e.g., not entirely through) the carrier 80'. In some embodiments, the carrier cover 110 can be made primarily of acrylic.

Figure 6:
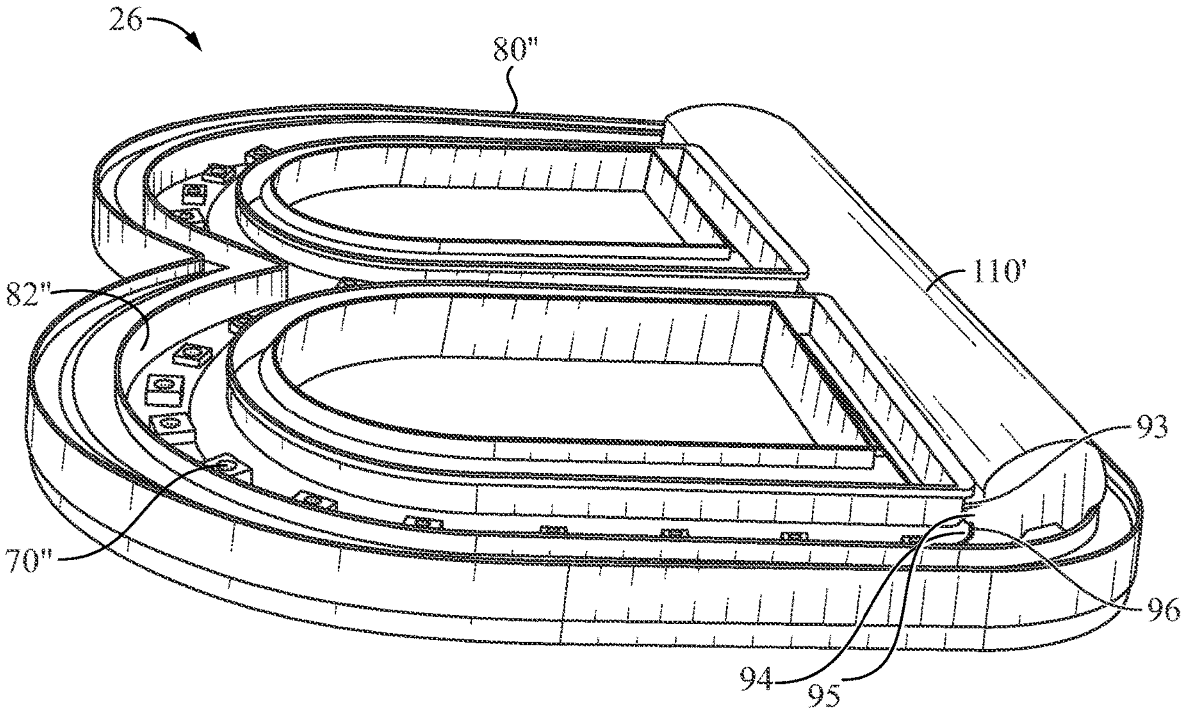
FIG. 6 illustrates an illustrative depiction of an LED assembly that includes a carrier cover, in accordance with some embodiments.

Referring to FIG. 6, an LED assembly 26 can include a carrier cover 110' that is attached to a carrier 80" by being engaged with the carrier 80". For example, one or more grooves 93 in the carrier 80" can receive a protrusion 95 of the carrier cover 110' so that the carrier cover 110' is retained by the carrier 80". As another example, one or more grooves 96 of the carrier cover 110' can receive a protrusion 94 of the carrier 80" so that the carrier cover 110' is retained by the carrier 80". In some embodiments, the carrier cover 110' can be made primarily of silicone. The LED assembly 26 can have one or more channels or apertures 82" that are constructed and arranged to receive the plurality of LEDs 70". The LEDs 70" can be positioned at least partially inside the one or more channels or apertures 82". In some embodiments, the one or more channels or apertures 82" can extend through (e.g., entirely through) the carrier 80".

Figure 7:
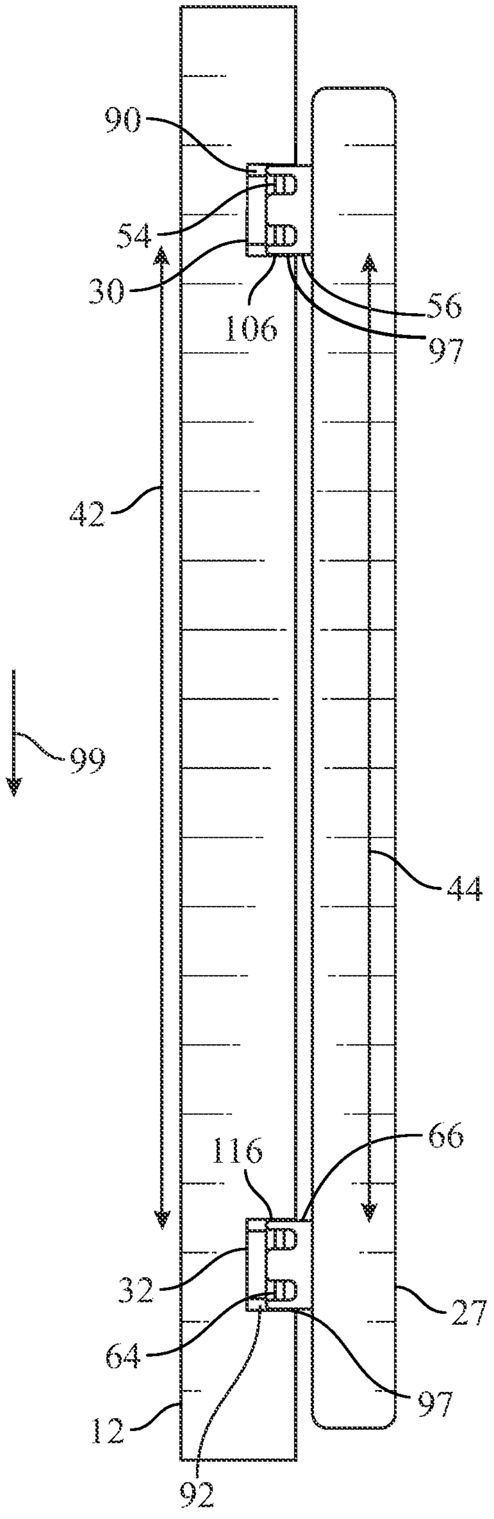
FIG. 7 illustrates an illustrative depiction of a side view of an electric sign, in accordance with some embodiments.

Referring to FIG. 7, in some embodiments, the first magnet 54 is constructed and arranged to be magnetically attached to the first metal strip 30 and the second magnet 64 is constructed and arranged to be magnetically attached to the second metal strip 32 so that the LED assembly 27 is magnetically attached to the first board 12. In some embodiments, the first magnet 54 and the second magnet 64 are constructed and arranged to be simultaneously magnetically attached to the first metal strip 30 and the second metal strip 32, respectively.

In some embodiments, the first board 12 can have a first groove 90 that is constructed and arranged to receive the first metal strip 30. The first metal strip 30 can be positioned inside the first groove 90. At least a portion 106 of the first metal contact 56 is constructed and arranged to be positioned inside the first groove 90. In some embodiments, the first board 12 can have a second groove 92 that is constructed and arranged to receive the second metal strip 32. The second metal strip 32 can be positioned inside the second groove 92. At least a portion 116 of the second metal contact 66 is constructed and arranged to be positioned inside the second groove 92. The first metal contact 56 and the second metal contact 66 can abut respective edges 97 defining the first groove 90 and the second groove 92 so that the LED assembly 27 is prevented from sliding in a downward direction 99.

In some embodiments, the first metal contact 56 can be constructed and arranged to electrically connect to (e.g., contact) the first metal strip 30. In some embodiments, the second metal contact 66 can be constructed and arranged to electrically connect to (e.g., contact) the second metal strip 32. In some embodiments, the first metal contact 56 and the second metal contact 66 are constructed and arranged to simultaneously electrically connect to (e.g., contact) the first metal strip 30 and the second metal strip 32, respectively. In some embodiments, the second predetermined distance 44 can be approximately the same as the first predetermined distance 42. In some embodiments, the second predetermined distance 44 can be smaller than the first predetermined distance 42, if for example the first metal contact 56 and the second metal contact 66 are sufficiently large to simultaneously electrically connect to the first metal strip 30 and the second metal strip 32, respectively. In some embodiments, the second predetermined distance 44 can be larger than the first predetermined distance 42, if for example the first metal contact 56 and the second metal contact 66 are sufficiently small to simultaneously electrically connect to the first metal strip 30 and the second metal strip 32, respectively. The LED assembly 27 can be constructed and arranged to electrically connect the first metal strip 30 to the second metal strip 32 while the LED assembly 27 is magnetically attached to the first board 12.

Referring to FIG. 1, any LED assembly 21, 22, 23, etc. of the one or more LED assemblies 20 is detachable from the first metal strip 30 and the second metal strip 32. After being detached, any LED assembly can be reattached at any position along the length 40 of the first metal strip 30 and the second metal strip 32. Any LED assembly 21, 22, 23, etc. can be rearranged from any position along the length 40 to any other position along the length 40 of the first metal strip 30 and the second metal strip 32. In some embodiments, the one or more LED assemblies 20 can be rearranged along the length of the first metal strip 30 and second metal strip 32 to convey different messages or phrases. In some embodiments, the one or more LED assemblies 20 are rearrangeable along the length of the first metal strip 30 and second metal strip 32.

The following description of variants is only illustrative of components, elements, acts, products, and methods considered to be within the scope of the invention and are not in any way intended to limit such scope by what is specifically disclosed or not expressly set forth. The components, elements, acts, products, and methods as described herein may be combined and rearranged other than as expressly described herein and are still considered to be within the scope of the invention.

According to variation 1, an electric sign device can include a first board; a first metal strip attached to the first board, the first metal strip having at least a first length and extending along the first board; a second metal strip attached to the first board, the second metal strip having at least the first length and extending along the first board, the second metal strip being separated from the first metal strip; a first light emitting diode (LED) assembly, comprising: a second board having a first width that is smaller than the first length; a first magnet; a first metal contact attached to a first side of the second board, the first metal contact being constructed and arranged to receive the first magnet, the first metal contact being constructed and arranged to contact the first metal strip; a second magnet; a second metal contact attached to the first side of the second board, the second metal contact being separated from the first metal contact, the second metal contact being constructed and arranged to receive the second magnet, the second metal contact being constructed and arranged to contact the second metal strip; a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board; wherein the first magnet is constructed and arranged to be magnetically attached to the first metal strip and the second magnet is constructed and arranged to be magnetically attached to the second metal strip so that the first LED assembly is magnetically attached to the first board; a second LED assembly, comprising: a third board having a second width that is smaller than the first length; a third magnet; a third metal contact attached to a first side of the third board, the third metal contact being constructed and arranged to receive the third magnet, the third metal contact being constructed and arranged to contact the first metal strip; a fourth magnet; a fourth metal contact attached to the first side of the third board, the fourth metal contact being separated from the third metal contact, the fourth metal contact being constructed and arranged to receive the fourth magnet, the fourth metal contact being constructed and arranged to contact the second metal strip; a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board; wherein the third magnet is constructed and arranged to be magnetically attached to the first metal strip and the fourth magnet is constructed and arranged to be magnetically attached to the second metal strip so that the second LED assembly is magnetically attached to the first board.

Variation 2 can include the electric sign device of variation 1, wherein the first carrier is formed to represent a first text character, and wherein the second carrier is formed to represent a second text character that is different than the first text character.

Variation 3 can include the electric sign device of variation 1, wherein the first LED assembly further comprises: a first carrier cover attached to the first carrier, the first carrier cover being constructed and arranged to cover at least a portion of the first carrier, the first carrier cover being at least partially transparent.

Variation 4 can include the electric sign device of variation 1, wherein: the first board has a first groove; the first metal strip is positioned inside the first groove; at least a portion of the first metal contact is constructed and arranged to be positioned inside the first groove; the first board has a second groove; the second metal strip is positioned inside the second groove; and at least a portion of the second metal contact is constructed and arranged to be positioned inside the second groove.

Variation 5 can include the electric sign device of variation 1, wherein the first LED assembly is constructed and arranged to electrically connect the first metal strip to the second metal strip while the first LED assembly is magnetically attached to the first board.

Variation 6 can include the electric sign device of variation 1, wherein the first or second metal strip is constructed and arranged to be connected to a power source.

Variation 7 can include the electric sign device of variation 1, wherein LEDs of the first plurality of LEDs are electrically connected in series.

Variation 8 can include the electric sign device of variation 1, wherein: the first magnet is a first neodymium magnet; and the second magnet is a second neodymium magnet.

Variation 9 can include the electric sign device of variation 1, wherein the first metal strip extends in a first direction, and the second metal strip extends in a second direction that is parallel to the first direction.

According to variation 10, an electric sign device can include a first board; a first metal strip attached to the first board, the first metal strip having at least a first length and extending along the first board; a second metal strip attached to the first board, the second metal strip having at least the first length and extending along the first board, the second metal strip being separated from the first metal strip; a first light emitting diode (LED) assembly, comprising: a second board having a first width that is smaller than the first length; a first magnet; a first metal contact attached to a first side of the second board, the first magnet being constructed and arranged to be attached to the first metal contact, the first metal contact being constructed and arranged to electrically connect to the first metal strip; a second magnet; a second metal contact attached to the first side of the second board, the second metal contact being separated from the first metal contact, the second magnet being constructed and arranged to be attached to the second metal contact, the second metal contact being constructed and arranged to electrically connect to the second metal strip; a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board; wherein the first magnet is constructed and arranged to be magnetically attached to the first metal strip and the second magnet is constructed and arranged to be magnetically attached to the second metal strip so that the first LED assembly is magnetically attached to the first board; a second LED assembly, comprising: a third board having a second width that is smaller than the first length; a third magnet; a third metal contact attached to a first side of the third board, the third magnet being constructed and arranged to be attached to the third metal contact, the third metal contact being constructed and arranged to electrically connect to the first metal strip; a fourth magnet; a fourth metal contact attached to the first side of the third board, the fourth metal contact being separated from the third metal contact, the fourth magnet being constructed and arranged to be attached to the fourth metal contact, the fourth metal contact being constructed and arranged to electrically connect to the second metal strip; a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board; wherein the third magnet is constructed and arranged to be magnetically attached to the first metal strip and the fourth magnet is constructed and arranged to be magnetically attached to the second metal strip so that the second LED assembly is magnetically attached to the first board.

Variation 11 can include the electric sign device of variation 10, wherein the first carrier is formed to represent a first text character, and wherein the second carrier is formed to represent a second text character that is different than the first text character.

Variation 12 can include the electric sign device of variation 10, wherein the first LED assembly further comprises: a first carrier cover attached to the first carrier, the first carrier cover being constructed and arranged to cover at least a portion of the first carrier, the first carrier cover being at least partially transparent.

Variation 13 can include the electric sign device of variation 10, wherein: the first board has a first groove; the first metal strip is positioned inside the first groove; at least a portion of the first metal contact is constructed and arranged to be positioned inside the first groove; the first board has a second groove; the second metal strip is positioned inside the second groove; and at least a portion of the second metal contact is constructed and arranged to be positioned inside the second groove.

Variation 14 can include the electric sign device of variation 10, wherein the first LED assembly is constructed and arranged to electrically connect the first metal strip to the second metal strip while the first LED assembly is magnetically attached to the first board.

Variation 15 can include the electric sign device of variation 10, wherein the first or second metal strip is constructed and arranged to be connected to a power source.

Variation 16 can include the electric sign device of variation 10, wherein LEDs of the first plurality of LEDs are electrically connected in series.

Variation 17 can include the electric sign device of variation 10, wherein: the first magnet is a first neodymium magnet; and the second magnet is a second neodymium magnet.

Variation 18 can include the electric sign device of variation 10, wherein the first metal strip extends in a first direction, and the second metal strip extends in a second direction that is parallel to the first direction.

According to variation 19, an electric sign device can include a first board; a first metal strip attached to the first board, the first metal strip having at least a first length and extending along the first board; a second metal strip attached to the first board, the second metal strip having at least the first length and extending along the first board, the second metal strip being separated from the first metal strip; a first light emitting diode (LED) assembly, comprising: a second board having a first width that is smaller than the first length; a first magnet attached to a first side of the second board; a first metal contact attached to the first side of the second board, the first magnet being constructed and arranged to be proximate to the first metal contact, the first metal contact being constructed and arranged to electrically connect to the first metal strip; a second magnet attached to the first side of the second board; a second metal contact attached to the first side of the second board, the second magnet being constructed and arranged to be proximate to the second metal contact, the second metal contact being separated from the first metal contact, the second metal contact being constructed and arranged to electrically connect to the second metal strip; a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board; wherein the first magnet is constructed and arranged to be magnetically attached to the first metal strip and the second magnet is constructed and arranged to be magnetically attached to the second metal strip so that the first LED assembly is magnetically attached to the first board; a second LED assembly, comprising: a third board having a second width that is smaller than the first length; a third magnet attached to a first side of the third board; a third metal contact attached to the first side of the third board, the third magnet being constructed and arranged to be proximate to the third metal contact, the third metal contact being constructed and arranged to electrically connect to the first metal strip; a fourth magnet attached to the first side of the third board; a fourth metal contact attached to the first side of the third board, the fourth metal contact being separated from the third metal contact, the fourth magnet being constructed and arranged to be proximate to the fourth metal contact, the fourth metal contact being constructed and arranged to electrically connect to the second metal strip; a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board; wherein the third magnet is constructed and arranged to be magnetically attached to the first metal strip and the fourth magnet is constructed and arranged to be magnetically attached to the second metal strip so that the second LED assembly is magnetically attached to the first board.

Variation 20 can include the electric sign device of variation 19, wherein the first carrier is formed to represent a first text character, and wherein the second carrier is formed to represent a second text character that is different than the first text character.

Many different embodiments have been disclosed herein, in connection with the above description and the drawings. It will be understood that it would be unduly repetitious and obfuscating to describe and illustrate every combination and sub-combination of these embodiments. Accordingly, all embodiments can be combined in any way and/or combination, and the present specification, including the drawings, shall be construed to constitute a complete written description of all combinations and sub-combinations of the embodiments described herein, and of the manner and process of making and using them, and shall support claims to any such combination or sub-combination.

An equivalent substitution of two or more elements can be made for any one of the elements in the claims below or that a single element can be substituted for two or more elements in a claim. Although elements can be described above as acting in certain combinations, and even initially claimed as such, it is to be expressly understood that one or more elements from a claimed combination can, in some cases, be excised from the combination and that the claimed combination can be directed to a sub-combination or variation of a sub-combination.

It will be appreciated by persons skilled in the art that the present embodiment is not limited to what has been particularly shown and described hereinabove. A variety of modifications and variations are possible considering the above teachings without departing from the following claims.

What is claimed is:

1. An electric sign device, comprising:

a first board;

a first metal strip attached to the first board, the first metal strip having at least a first length and extending along the first board;

a second metal strip attached to the first board, the second metal strip having at least the first length and extending along the first board, the second metal strip being separated from the first metal strip;

a first light emitting diode (LED) assembly, comprising:

a second board having a first width that is smaller than the first length;

a first magnet;

a first metal contact attached to a first side of the second board, the first metal contact being constructed and arranged to receive the first magnet, the first metal contact being constructed and arranged to contact the first metal strip;

a second magnet;

a second metal contact attached to the first side of the second board, the second metal contact being separated from the first metal contact, the second metal contact being constructed and arranged to receive the second magnet, the second metal contact being constructed and arranged to contact the second metal strip;

a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board;

wherein the first magnet is constructed and arranged to be magnetically attached to the first metal strip and the second magnet is constructed and arranged to be magnetically attached to the second metal strip so that the first LED assembly is magnetically attached to the first board;

a second LED assembly, comprising:

a third board having a second width that is smaller than the first length;

a third magnet;

a third metal contact attached to a first side of the third board, the third metal contact being constructed and arranged to receive the third magnet, the third metal contact being constructed and arranged to contact the first metal strip;

a fourth magnet;

a fourth metal contact attached to the first side of the third board, the fourth metal contact being separated from the third metal contact, the fourth metal contact being constructed and arranged to receive the fourth magnet, the fourth metal contact being constructed and arranged to contact the second metal strip;

a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board;

wherein the third magnet is constructed and arranged to be magnetically attached to the first metal strip and the fourth magnet is constructed and arranged to be magnetically attached to the second metal strip so that the second LED assembly is magnetically attached to the first board.

2. The electric sign device of claim 1, wherein the first carrier is formed to represent a first text character, and wherein the second carrier is formed to represent a second text character that is different than the first text character.

3. The electric sign device of claim 1, wherein the first LED assembly further comprises:

a first carrier cover attached to the first carrier, the first carrier cover being constructed and arranged to cover at least a portion of the first carrier, the first carrier cover being at least partially transparent.

4. The electric sign device of claim 1, wherein:

the first board has a first groove;

the first metal strip is positioned inside the first groove;

at least a portion of the first metal contact is constructed and arranged to be positioned inside the first groove;

the first board has a second groove;

the second metal strip is positioned inside the second groove; and at least a portion of the second metal contact is constructed and arranged to be positioned inside the second groove.

5. The electric sign device of claim 1, wherein the first LED assembly is constructed and arranged to electrically connect the first metal strip to the second metal strip while the first LED assembly is magnetically attached to the first board.

6. The electric sign device of claim 1, wherein the first or second metal strip is constructed and arranged to be connected to a power source.

7. The electric sign device of claim 1, wherein LEDs of the first plurality of LEDs are electrically connected in series.

8. The electric sign device of claim 1, wherein:

the first magnet is a first neodymium magnet; and the second magnet is a second neodymium magnet.

9. The electric sign device of claim 1, wherein the first metal strip extends in a first direction, and the second metal strip extends in a second direction that is parallel to the first direction.

10. An electric sign device, comprising:

a first board;

a first metal strip attached to the first board, the first metal strip having at least a first length and extending along the first board;

a second metal strip attached to the first board, the second metal strip having at least the first length and extending along the first board, the second metal strip being separated from the first metal strip;

a first light emitting diode (LED) assembly, comprising:

a second board having a first width that is smaller than the first length;

a first magnet;

a first metal contact attached to a first side of the second board, the first magnet being constructed and arranged to be attached to the first metal contact, the first metal contact being constructed and arranged to electrically connect to the first metal strip;

a second magnet;

a second metal contact attached to the first side of the second board, the second metal contact being separated from the first metal contact, the second magnet being constructed and arranged to be attached to the second metal contact, the second metal contact being constructed and arranged to electrically connect to the second metal strip;

a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board;

wherein the first magnet is constructed and arranged to be magnetically attached to the first metal strip and the second magnet is constructed and arranged to be magnetically attached to the second metal strip so that the first LED assembly is magnetically attached to the first board;

a second LED assembly, comprising:

a third board having a second width that is smaller than the first length;

a third magnet;

a third metal contact attached to a first side of the third board, the third magnet being constructed and arranged to be attached to the third metal contact, the third metal contact being constructed and arranged to electrically connect to the first metal strip;

a fourth magnet;

a fourth metal contact attached to the first side of the third board, the fourth metal contact being separated from the third metal contact, the fourth magnet being constructed and arranged to be attached to the fourth metal contact, the fourth metal contact being constructed and arranged to electrically connect to the second metal strip;

a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board;

wherein the third magnet is constructed and arranged to be magnetically attached to the first metal strip and the fourth magnet is constructed and arranged to be magnetically attached to the second metal strip so that the second LED assembly is magnetically attached to the first board.

11. The electric sign device of claim 10, wherein the first carrier is formed to represent a first text character, and wherein the second carrier is formed to represent a second text character that is different than the first text character.

12. The electric sign device of claim 10, wherein the first LED assembly further comprises:

a first carrier cover attached to the first carrier, the first carrier cover being constructed and arranged to cover at least a portion of the first carrier, the first carrier cover being at least partially transparent.

13. The electric sign device of claim 10, wherein:

the first board has a first groove;

the first metal strip is positioned inside the first groove;

at least a portion of the first metal contact is constructed and arranged to be positioned inside the first groove;

the first board has a second groove;

the second metal strip is positioned inside the second groove; and at least a portion of the second metal contact is constructed and arranged to be positioned inside the second groove.

14. The electric sign device of claim 10, wherein the first LED assembly is constructed and arranged to electrically connect the first metal strip to the second metal strip while the first LED assembly is magnetically attached to the first board.

15. The electric sign device of claim 10, wherein the first or second metal strip is constructed and arranged to be connected to a power source.

16. The electric sign device of claim 10, wherein LEDs of the first plurality of LEDs are electrically connected in series.

17. The electric sign device of claim 10, wherein:

the first magnet is a first neodymium magnet; and the second magnet is a second neodymium magnet.

18. The electric sign device of claim 10, wherein the first metal strip extends in a first direction, and the second metal strip extends in a second direction that is parallel to the first direction.

19. An electric sign device, comprising:

a first board;

a first metal strip attached to the first board, the first metal strip having at least a first length and extending along the first board;

a second metal strip attached to the first board, the second metal strip having at least the first length and extending along the first board, the second metal strip being separated from the first metal strip;

a first light emitting diode (LED) assembly, comprising:

a second board having a first width that is smaller than the first length;

a first magnet attached to a first side of the second board;

a first metal contact attached to the first side of the second board, the first magnet being constructed and arranged to be proximate to the first metal contact, the first metal contact being constructed and arranged to electrically connect to the first metal strip;

a second magnet attached to the first side of the second board;

a second metal contact attached to the first side of the second board, the second magnet being constructed and arranged to be proximate to the second metal contact, the second metal contact being separated from the first metal contact, the second metal contact being constructed and arranged to electrically connect to the second metal strip;

a first plurality of LEDs disposed on a second side of the second board, the first plurality of LEDs being electrically connected to the first metal contact and the second metal contact; and a first carrier having one or more first channels or apertures that are constructed and arranged to at least partially receive the first plurality of LEDs, the first carrier being attached to the second board;

wherein the first magnet is constructed and arranged to be magnetically attached to the first metal strip and the second magnet is constructed and arranged to be magnetically attached to the second metal strip so that the first LED assembly is magnetically attached to the first board;

a second LED assembly, comprising:

a third board having a second width that is smaller than the first length;

a third magnet attached to a first side of the third board;

a third metal contact attached to the first side of the third board, the third magnet being constructed and arranged to be proximate to the third metal contact, the third metal contact being constructed and arranged to electrically connect to the first metal strip;

a fourth magnet attached to the first side of the third board;

a fourth metal contact attached to the first side of the third board, the fourth metal contact being separated from the third metal contact, the fourth magnet being constructed and arranged to be proximate to the fourth metal contact, the fourth metal contact being constructed and arranged to electrically connect to the second metal strip;

a second plurality of LEDs disposed on a second side of the third board, the second plurality of LEDs being electrically connected to the third metal contact and the fourth metal contact; and a second carrier having one or more second channels or apertures that are constructed and arranged to at least partially receive the second plurality of LEDs, the second carrier being attached to the third board;

wherein the third magnet is constructed and arranged to be magnetically attached to the first metal strip and the fourth magnet is constructed and arranged to be magnetically attached to the second metal strip so that the second LED assembly is magnetically attached to the first board.

20. The electric sign device of claim 19, wherein the first carrier is formed to represent a first text character, and wherein the second carrier is formed to represent a second text character that is different than the first text character.

* * * * *